United States Patent
Malm

(10) Patent No.: US 9,534,564 B2
(45) Date of Patent: Jan. 3, 2017

(54) SYSTEM AND METHOD FOR CONTROLLING A FLOW OF VENT GASES TO A NATURAL GAS ENGINE

(71) Applicant: REM Technology Inc., Calgary (CA)

(72) Inventor: Howard Malm, Coquitlam (CA)

(73) Assignee: REM TECHNOLOGY INC, Calgary (CA)

( * ) Notice: Subject to any disclaimer, the term of this patent is extended or adjusted under 35 U.S.C. 154(b) by 215 days.

(21) Appl. No.: 14/340,451

(22) Filed: Jul. 24, 2014

(65) Prior Publication Data

US 2015/0176534 A1  Jun. 25, 2015

(51) Int. Cl.
  F02M 21/02 (2006.01)
  F02M 21/04 (2006.01)
  F23N 1/02 (2006.01)
  F23N 5/18 (2006.01)
  F23G 7/06 (2006.01)
  F02M 55/00 (2006.01)
  F02D 41/00 (2006.01)

(52) U.S. Cl.
  CPC ......... *F02M 21/0215* (2013.01); *F02M 21/04* (2013.01); *F02M 21/047* (2013.01); *F02M 55/007* (2013.01); *F23G 7/06* (2013.01); *F23N 1/025* (2013.01); *F23N 5/18* (2013.01); *F02D 41/0025* (2013.01); *F23K 2900/05001* (2013.01); *F23N 2025/04* (2013.01)

(58) Field of Classification Search
  CPC . F02D 41/0025; F02M 21/0215; F02M 21/04; F02M 21/047; F02M 55/007
  USPC ........ 123/445, 527, 531, 698, 525, 518, 572
  See application file for complete search history.

(56) References Cited

U.S. PATENT DOCUMENTS

| | | | | |
|---|---|---|---|---|
| 3,393,669 | A * | 7/1968 | Vardi | F02M 25/089 123/520 |
| 6,279,547 | B1 * | 8/2001 | Mancini | F02M 25/08 123/516 |
| 7,900,608 | B2 * | 3/2011 | Peters | F02M 25/0836 123/518 |
| 8,113,181 | B2 | 2/2012 | Malm | |
| 8,382,469 | B2 | 2/2013 | Malm | |
| 2008/0127950 | A1 * | 6/2008 | Malm | F02B 43/10 123/527 |
| 2011/0094593 | A1 * | 4/2011 | Malm | F02C 3/22 137/2 |

\* cited by examiner

*Primary Examiner* — Mahmoud Gimie
(74) *Attorney, Agent, or Firm* — James P. Muraff; Neal, Gerber & Eisenberg LLP

(57) ABSTRACT

A system and method controls a flow of vent gases to a combustion engine. The system includes an inlet for receiving the vent gases, a pressure relief device that enables the vent gases to escape to atmosphere when a pressure in the inlet exceeds a predetermined relief pressure, a flow-restricting orifice, and a back pressure regulator disposed downstream of the orifice. A shut-off valve disposed between the back pressure regulator and the air intake is set to only open when an intake pressure falls below a predetermined negative intake pressure.

22 Claims, 11 Drawing Sheets

SYSTEM AND METHOD FOR CONTROLLING A FLOW OF VENT GASES TO A NATURAL GAS ENGINE

CROSS-REFERENCE TO RELATED PATENT APPLICATION

This application claims the benefit of Canadian Patent Application No. 2,838,150, filed on Dec. 13, 2013, in the Canadian Intellectual Property Office, the disclosure of which is incorporated herein in its entirety by reference.

TECHNICAL FIELD

The present disclosure relates to vent gases from petroleum production and processing and, in particular, to combusting the vent gases in an internal combustion engine.

BACKGROUND

The venting of hydrocarbon vapors into the atmosphere has been a common practice at many petroleum production and processing facilities. Often, where the amounts are substantial, the vapors are collected, recompressed and used. There are many other locations where these vapors are vented to the atmosphere or flared. Recently, as of 2012/2013, the United States Environmental Protection Agency (EPA) has placed an upper limit on the amount of volatile organic vapors (VOCs) that may be vented. There is also a desire to minimize the venting of methane gases or gases that decompose to methane to the atmosphere because methane ($CH_4$) has a strong greenhouse gas (heat-trapping) effect, being twenty-one times more effective than carbon dioxide over a 100-year period.

A conventional method of dealing with the vented gases is to combust the gases. The standard method of combusting these gases is to feed these gases to an incinerator unit or flare where a pilot, either continuous or started on demand, feeds into the vented gases in the presence of air to ignite the gases. In the case of a flare, the vent gases are directed through a vertical tube or pipe and burned as the gases contact air. Since a flare is undesirable from an environmental and public perception point of view, the general preference is to enclose the flame and to regulate the air flow to achieve combustion with good air-fuel ratio control. The disadvantage with flares and incinerators is that the heat energy from the vapor combustion is lost and not used. In addition, adding a flare or incinerator to a site may require additional effort to obtain permission for installation and operation by regulatory authorities.

Another approach is to combust the vented gases in a natural gas engine. U.S. Pat. No. 8,382,469 (Malm) discloses a method and apparatus for utilizing fugitive gases (i.e. vent gases) as a supplementary fuel source for a natural gas engine. This technique provides a number of advantages: fuel savings, elimination of methane, elimination of volatile organic compounds (VOC) and elimination of benzene, toluene, ethylbenzene, and xylene-volatile aromatic compounds (BTEX).

U.S. Pat. No. 8,113,181 (Malm) discloses a control system for regulating vent gas flow to a natural gas engine. Because a vent source can have an unpredictable and variable flow, the control system provides methods either for limiting the maximum flow to the engine or adjusting the engine air to fuel ratio according to the vent gas flow rate. However, a control system with flow measurement devices that provide signals to a microcontroller, though useful in some circumstances, adds cost and complexity.

Accordingly, a simpler system and method for controlling the flow of vent gases to an engine such as a natural gas engine remains highly desirable.

SUMMARY

In accordance with an aspect of the present disclosure there is provided a system for controlling a flow of vent gases to a combustion engine having a filter for the engine air intake duct. The system comprises an inlet for receiving the vent gases, a pressure relief device that enables the vent gases to escape to atmosphere when a pressure in the inlet exceeds a predetermined relief pressure, a flow-restricting orifice, a back pressure regulator disposed downstream of the orifice for regulating a maximum pressure in a duct between the orifice and the back pressure regulator, and a shut-off valve disposed between the back pressure regulator and an air intake duct of the engine, the valve being set to only open when an intake duct pressure falls below a predetermined negative intake duct pressure. The air intake of the engine includes the air intake duct 12 and an air intake manifold. That distributes the intake air or air-fuel mixture to the engine cylinders.

In one embodiment, the system further includes an engine speed switch (e.g. RPM switch) responsive to engine speed that is disposed in series with a pressure switch responsive to air duct intake pressure. The engine speed switch and the pressure switch cooperate to regulate opening and closing of the shut-off valve such that the shut-off valve opens only when both an engine speed is above a predetermined minimal engine speed and the intake duct pressure is below the predetermined negative intake pressure.

In accordance with another aspect of the present disclosure there is provided a method for controlling a flow of vent gases to a combustion engine. The method entails receiving vent gases into an inlet. If a vent gas pressure in the inlet exceeds a predetermined relief pressure, the vent gases are released to atmosphere via a pressure relief device. If the vent gas pressure in the inlet exceeds a back pressure regulator setting of a back pressure regulator, the vent gases flow through a flow-restricting orifice and the back pressure regulator downstream of the orifice. As the flow rate increases, the orifice causes the pressure at the back pressure regulator to become smaller, thus limiting the maximum vent gas flow to the engine. A suitable choice of orifice size and regulator settings ensures that the vent gas flow rate to the engine intake cannot exceed a predetermined value. If the engine is not operating or operating at a very low fuel consumption rate such as an engine idle condition, the intake duct vacuum resulting from the air intake filter is relatively small. To ensure that the vent gases are admitted to the engine air intake only when the engine air consumption, and therefore its fuel consumption, are large enough a shut-off valve between the back pressure regulator and an air intake duct of the engine is provided and if the intake duct pressure is below a predetermined negative intake duct pressure, is opened to enable the vent gases to flow into the air intake duct of the engine.

In one implementation of the method, the opening or closing of the shut-off valve is accomplished using a pressure switch in series with an engine speed switch such that the shut-off valve opens only when both an engine speed (e.g. RPM) is above a predetermined minimal engine speed (e.g. RPM) and the intake duct pressure is below the predetermined negative intake duct pressure.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The terms "vent gases" or "fugitive gases" include any hydrocarbon-containing gases or combustible gases that are emitted as a by-product of a petroleum process. These vent gases or fugitive gases are collected and delivered as a supplementary source of fuel to an engine. The vent gases mix with air and natural gas in the engine combustion chamber to form a combustible mixture that combusts inside the engine combustion chamber. For the purposes of this specification, the term "natural gas engine" means an engine that uses gaseous fuels such as natural gas, methane, ethane, propane and other gaseous combustible fuels.

Embodiments of the invention are described below, by way of example only, with reference to FIGS. 1-11.

Figure 1:
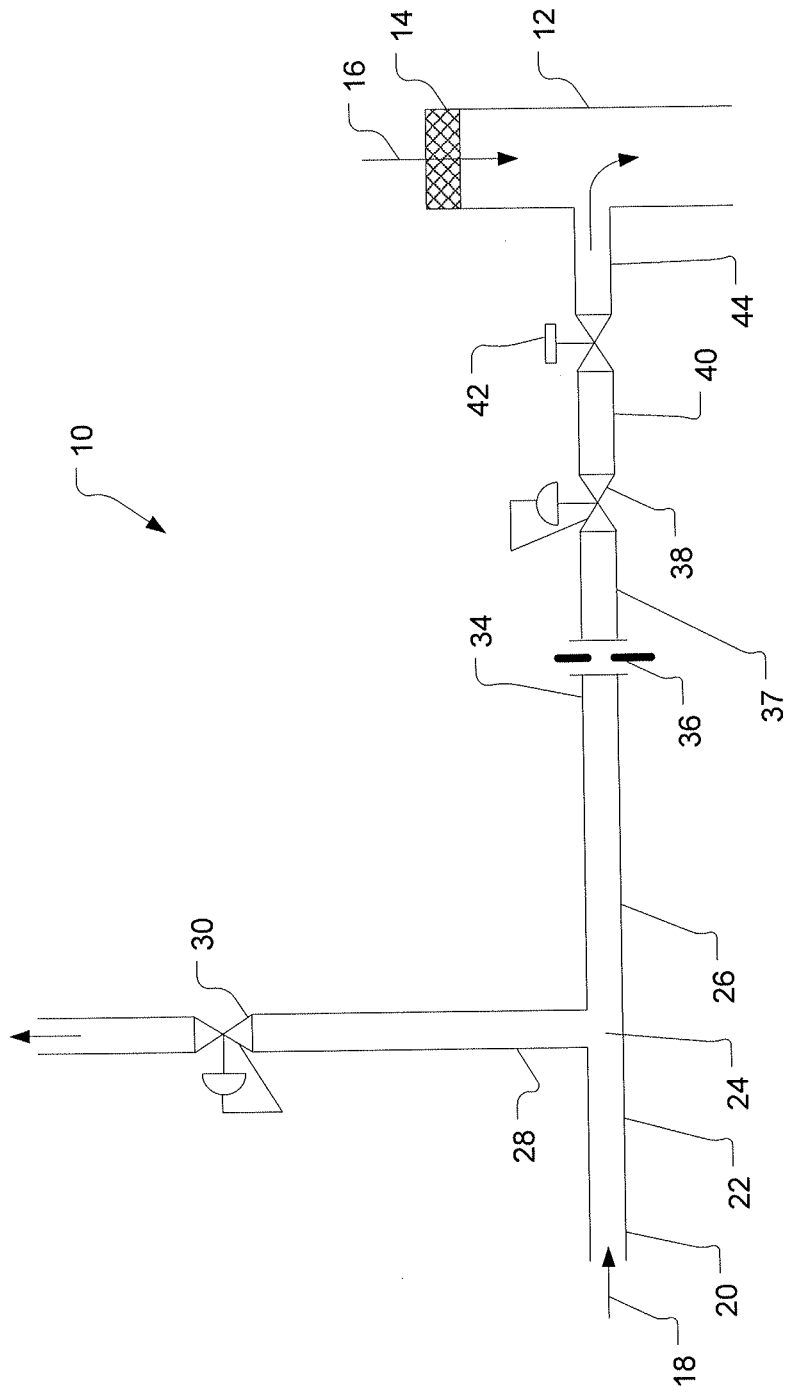
FIG. 1 is a schematic depiction of a system for controlling vent gases routed to an air intake duct of an internal combustion engine in accordance with a first embodiment of the invention.

FIG. 1 schematically depicts a system which is generally designed by reference numeral 10 for controlling a flow of vent gases to an air intake duct 12 of an internal combustion engine in accordance with a first embodiment of the invention. The vent gases may include methane, ethane, propane and butane and smaller amounts of other volatile gases. The vent gases may come from one or multiple sources such as, for example, instrument gas (e.g. actuators, transducers, pumps, membrane driers), compressor packing, liquid storage tanks (e.g. oil storage, scrubber dump collection, separator dump collection) or other sources like dehydrators or centrifugal compressor wet seals. The system 10 regulates vent gas flow into an air intake duct 12 of a combustion engine, such as an internal combustion engine, e.g. a natural gas internal combustion engine. The system 10 is primarily designed for natural gas engines but it will be appreciated that the system may also be used, or adapted for use, with other types of engines. The air intake duct 12 has an air filter 14 for filtering an intake air flow 16. This intake air flow 16 is normally air at atmospheric pressure.

The system 10 receives vent gases 18 at an inlet 20 that is adapted or configured for receiving the vent gases. The air inlet duct may optionally include a filter 14. The system includes a first duct 22 connected to the inlet 20. The first duct has a bifurcation or splitter 24 that splits flow into two duct sections: a first duct section 26 and a second (relief) duct section 28. The relief duct section 28 leads to a pressure relief device 30. The relief device 30 may be a back pressure regulator, a relief valve or check valve (spring loaded diaphragm). The relief device relieves pressure in the system by enabling vent gases to escape to atmosphere when the pressure in the inlet (or in the relief duct section) exceeds a predetermined relief pressure.

As depicted by way of example in FIG. 1, the system 10 has an orifice 36 followed by a back pressure regulator 38 and a shut-off valve 42. A pressure relief device 30 allows venting of excess gases to the atmosphere. This system 10 delivers the combustible vapors to the air intake duct 12 of an engine. The gases may be delivered before or after the engine air intake filter 14; the preferable option is to deliver the gases after the air intake filter 16 to take advantage of the reduced pressure due to the pressure loss encountered by the intake air in flowing through the filter 16. A back pressure regulator 38 controls the vent gas pressure at its inlet unaffected by the lower pressure at the engine intake duct 12. A shut-off valve 42 is opened or closed according to the operating state of the engine.

As the flow of the vent gases increases from zero, the gauge pressure, the pressure in duct 26, increases. When the pressure exceeds the setting of the back pressure regulator 38, gas flows through the back pressure regulator 38 provided the pressure in the engine air intake duct 12 is less than the back pressure setting and if the shut-off valve 42 is open. The back pressure regulator 38 serves to limit the maximum pressure in the duct 37 between the orifice 36 and the back pressure regulator 38. Hence, as the vent gas flow increases, the pressure increases in duct 26 due to the pressure drop caused by the orifice 36. Eventually the gas pressure in duct 26 reaches a value where the relief device 30 opens and prevents the vent gas pressure from rising further. The maximum flow into the engine intake duct is then determined by the orifice size, the back pressure setting of back pressure regulator 38, and the relief pressure of relief device 30. For this method the back pressure regulator setting is with reference to atmospheric pressure. Once the vent gas pressure before the back pressure regulator exceeds its setting, then the gas flow amount is unaffected by the amount of the negative pressure in the air intake duct. The shut-off valve serves to prevent the vent gases from entering the intake air duct when the engine is not running or running below speed and manifold threshold.

The orifice diameter can be chosen according to the maximum vent gas flow desired and the relief pressure. The table below shows, for one specific implementation, the orifice diameter in microns to provide the desired air flow in standard cubic feet per minute (scf/m) at the relief pressure, where 1 scf/m=0.472 Vs. The pressure difference ΔP, stated in inches of water column and kilopascals, is the pressure difference between the ducts on either side of the flow-restricting orifice. The flows for gases with other compositions may be more or less following well-known flow-density relationships.

| ΔP | ΔP | Flow scf/m | | | |
|---|---|---|---|---|---|
| "H2O | kPa | 1 | 2 | 4 | 8 |
| 2 | 0.498 | 5326 | 7536 | 10655 | 15070 |
| 4 | 0.996 | 4582 | 6480 | 9164 | 12962 |
| 8 | 1.991 | 3741 | 5291 | 7483 | 10607 |
| 10 | 2.489 | 3551 | 5022 | 6932 | 10046 |
| 15 | 3.733 | 3139 | 4437 | 6276 | 8877 |
| 20 | 4.978 | 2845 | 4023 | 5690 | 8047 |

To show the behaviour of the system, the vent gas flow rate has been plotted as a function of vent gas pressure. Generally, the vent gas originates from a relatively high pressure source so the pressure imposed on the vent gas will not significantly affect the vent gas flow rate.

Figure 2:
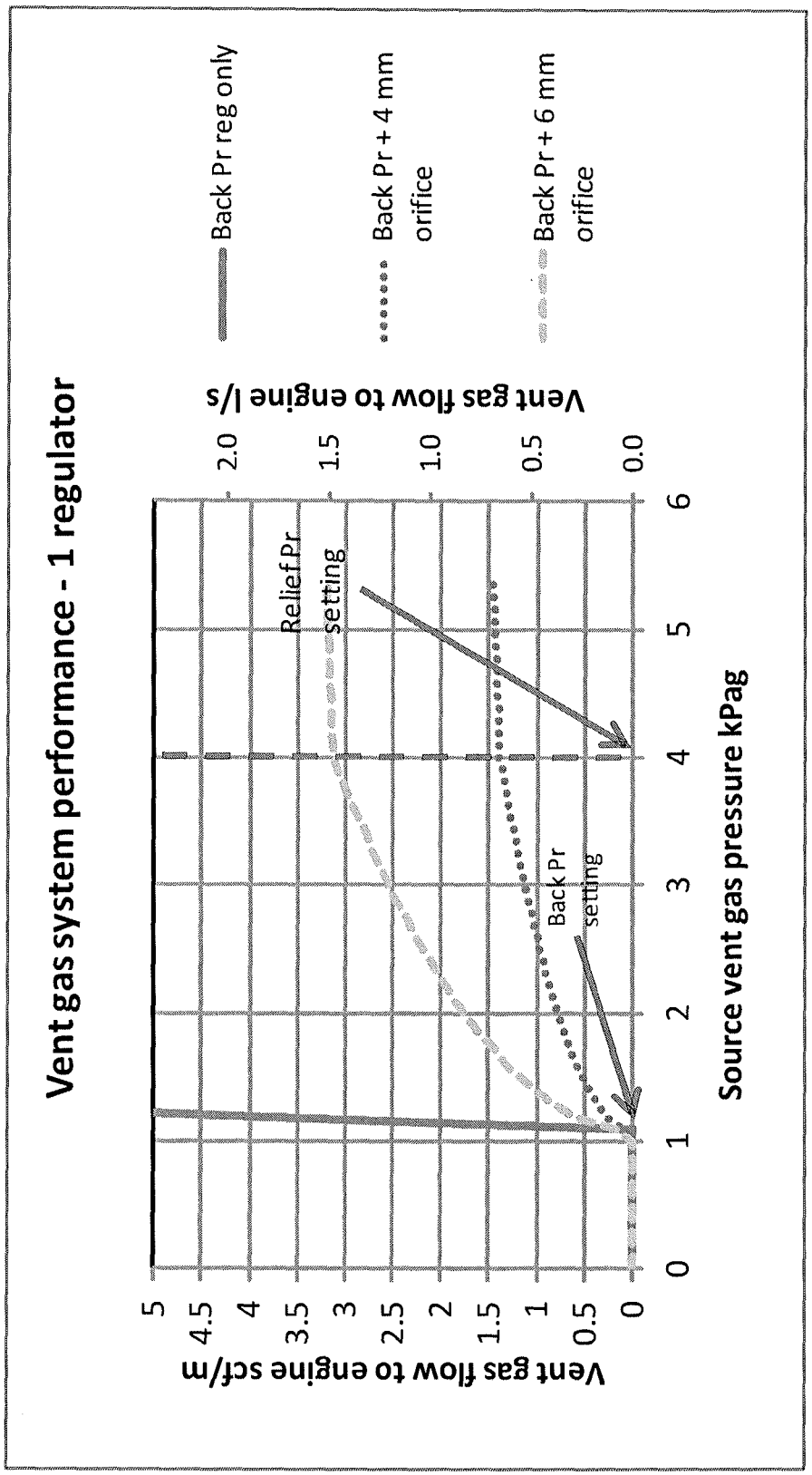
FIG. 2 is a graph showing system performance for a one-regulator system.

FIG. 2 is a graph showing system performance for a one-regulator system such as the one shown by way of example in FIG. 1.

The graph of FIG. 2 shows that with a back pressure regulator only, when the vent gas pressure reaches the set-point of the back pressure regulator, the vent gas pressure will be regulated to the set-point pressure of the back pressure regulator but the vent gas flow rate to the engine intake air duct is unregulated. To account for the non-zero flow resistance of the back pressure regulator, the vent gas pressure will increase slightly with flow according to the specifications and design of the regulator. This is shown in the graph of FIG. 2.

With the placement of an orifice before the back pressure regulator, the pressure of the vent gas in duct 26, after it reaches the set-point of the back pressure regulator, will increase as the flow increases. The vent gas pressure in duct 26 will continue to increase until the vent gas pressure reaches the set-point pressure of the relief device. The relief device should be sized to cope with the maximum vent gas flow expected without causing the vent gas pressure in duct 26 to become too large. The graph of FIG. 2 shows two examples for air flow orifice diameter of 4000 microns or 4 mm and a diameter of 6000 microns or 6 mm with the back pressure setting of 1.09 kPa relative to atmospheric pressure and the relief pressure set at 4 kPa relative to atmospheric pressure. The air maximum flow for the 4 mm diameter orifice is about 0.7 liters per second and for the 6 mm orifice is about 1.5 liters/second. The flow rates will be larger or smaller than these amounts for gases with specific gravities larger or smaller than that of air according to well-known relationships for orifice flow. The choice of the orifice size determines the maximum vent gas flow that will go to the engine air intake duct.

This arrangement is quite a simple design. If necessary, a demister filter may be added to remove oil and other foreign material from the vent gases.

When the shut-off valve 42 is closed, the vent gas pressure rises up to the set-point of the relief device 30, which allows the gases to be vented to the atmosphere. The design has the advantage of simplicity but does have the disadvantage that the vent pressure varies between the back pressure set-point and the relief device set-point according to the vent gas flow rate. As well, the maximum flow cannot be remotely adjusted.

One such means of adjusting the maximum is switching an additional orifice in parallel with the existing orifice as previously described by Maim in the above-cited references. Another system and method for adjusting the maximum flow is described below.

Figure 3:
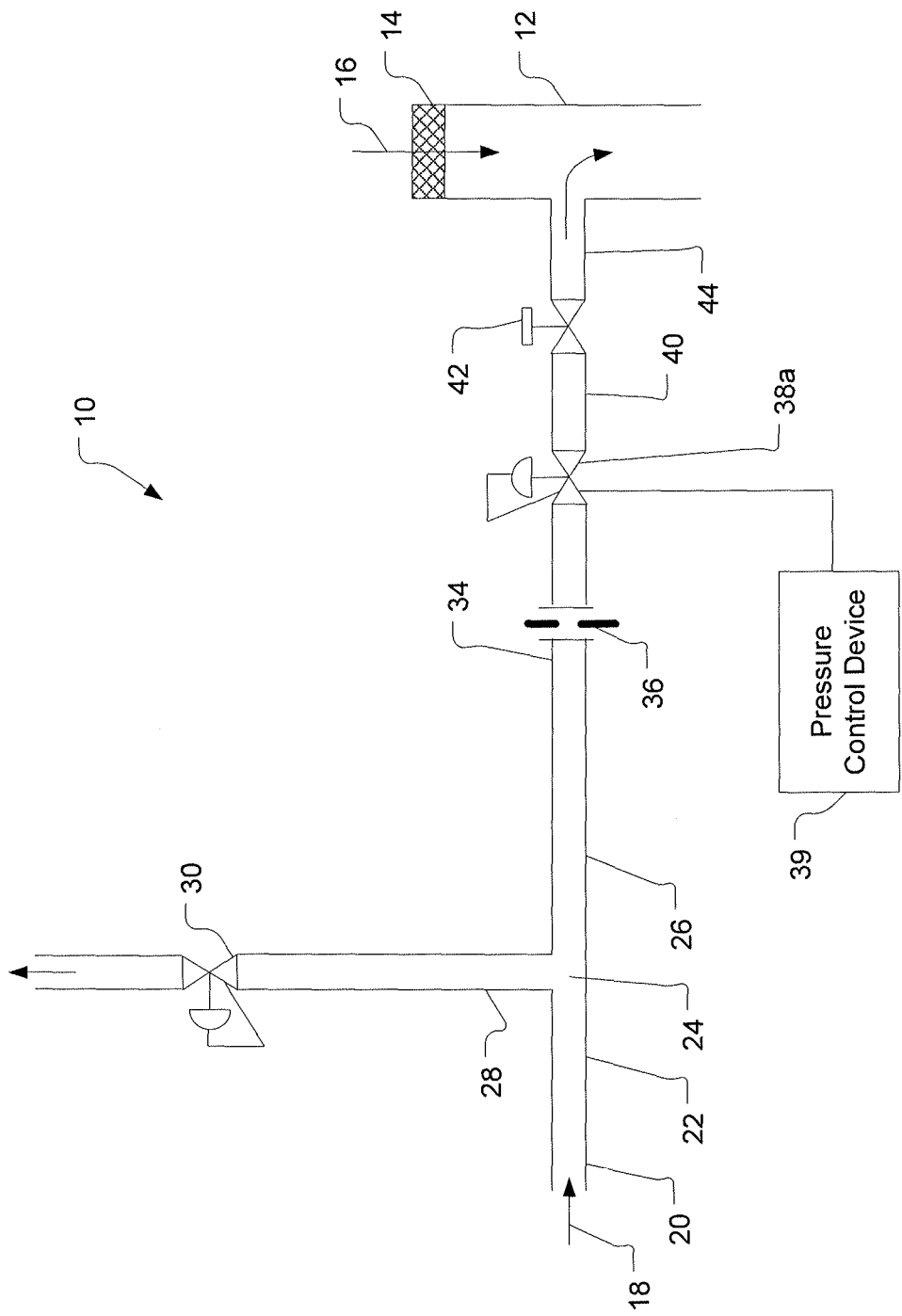
FIG. 3 is a schematic depiction of a system for controlling vent gases routed to an air intake duct of an internal combustion engine in accordance with a second embodiment of the invention.

FIG. 3 schematically depicts another system 10 for controlling a flow of vent gases to an air intake of an internal combustion engine. The system 10 of FIG. 3 further includes a pressure control device 39.

For this method the back pressure regulator 38 is replaced with a back pressure regulator 38*a* and pressure control device 39 so that a bias pressure can be applied to modify the back pressure set-point and so adjust the flow maximum.

The pressure control device 39 be any one of a number of devices such as a current-to-pressure transducer controlled electronically, or a pneumatic relay which uses a variable pressure from another source to control the bias pressure applied to the biased back pressure regulator 38*a*. A proportional pneumatic relay could use the engine intake manifold pressure value to adjust the bias pressure and so adjust the maximum vent gas flow according to the engine load. In this way the maximum flow limit can be changed by increasing the bias pressure to modify the set-point of the back pressure regulator.

Figure 4:
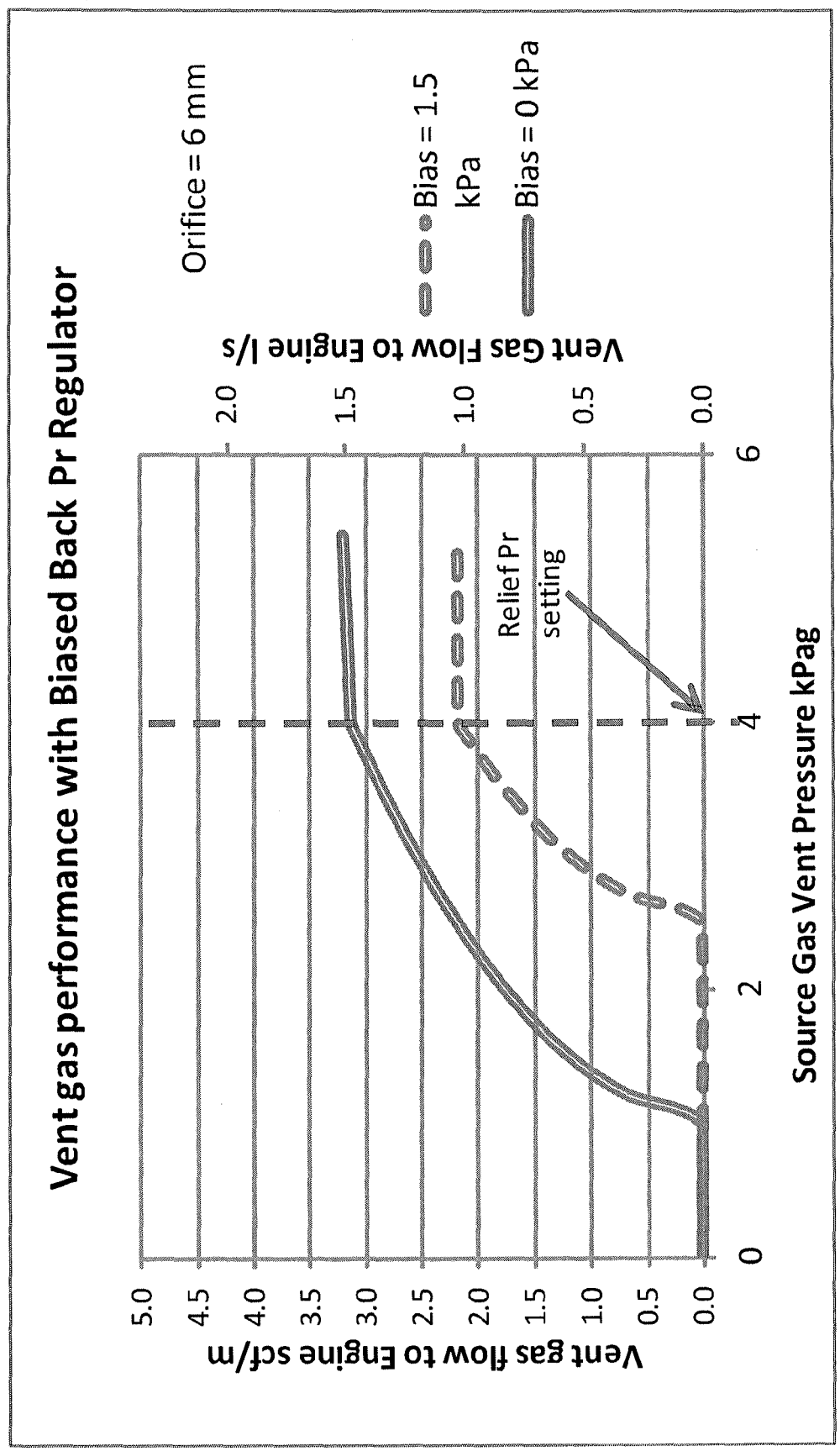
FIG. 4 is a graph showing system performance for a system having a biased back pressure regulator.

FIG. 4 is a graph showing system performance for a system having a biased back pressure regulator. The graph shows the effect of altering the bias pressure with a 6 mm orifice. By application of a bias of 1.5 kPa to the regulator the maximum flow with an orifice of 6 mm can be reduced from 2.2 Vs to 1.5 Ws. This system enables changes to be made to the maximum vent gas flow to the engine by automatic means according to the operating state of the engine. Nevertheless, the gas pressure of the vent gases does change according to the vent gas flow. Normally this does not pose as a problem to equipment operation. A more complex system can reduce the pressure variation of the vent gas system.

A modified system is now described below that reduces the vent pressure variation with flow. This system utilizes two regulators, a front pressure regulator 32 and a back pressure regulator 38.

Figure 5:
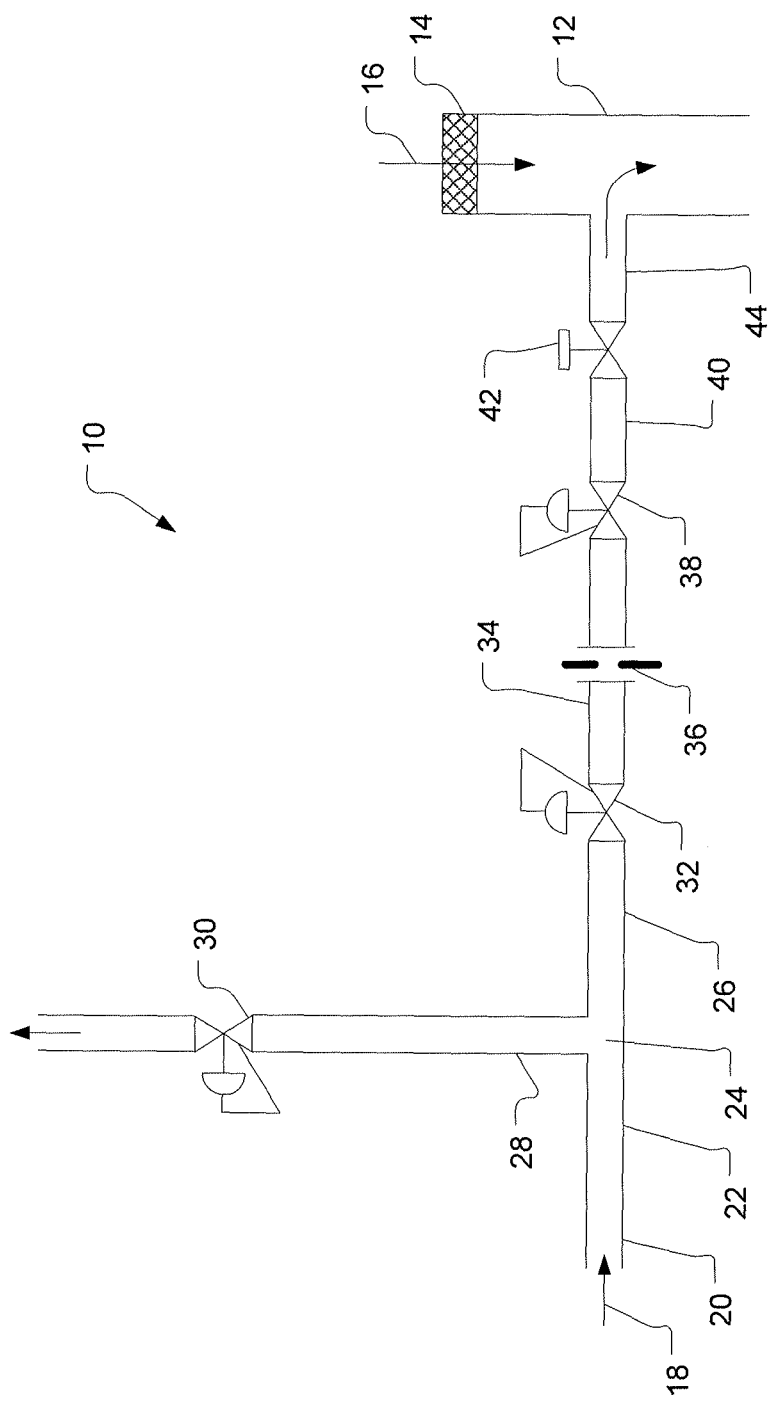
FIG. 5 is a schematic depiction of a system for controlling vent gases routed to an air intake duct of an internal combustion engine in accordance with a third embodiment of the invention.

FIG. 5 depicts a modified system 10 for controlling the flow of vent gases to a combustion engine. As previously described, the system 10 receives vent gases 18 at the inlet 20. The vent gases flow through the first duct 22 to the bifurcation or splitter 24 that splits the vent gas flow into two duct sections: the first duct section 26 and the second (relief) duct section 28, latter leading to the pressure relief device 30 as described above.

Downstream of the duct section 26 is a front pressure regulator (valve) 32. The front pressure regulator is set at a front pressure setting (or front pressure regulator setting).

Connected downstream of the front pressure regulator is a second duct 34. This second duct may include a flow-restricting orifice 36. In other words, the flow-restricting orifice 36 is disposed between the front pressure regulator and the back pressure regulator.

Downstream of the flow-restricting orifice 36 is a back pressure regulator (valve) 38. The back pressure regulator is disposed downstream of the front pressure regulator and is set at a back pressure setting (or back pressure regulator setting) that is lower than the front pressure setting. The back pressure regulator and the front pressure regulator cooperate to regulate the flow of the vent gases into the air intake 12 of the engine.

In one embodiment, the pressure relief device 30 is set a pressure setting that is higher than the pressure setting of the front pressure regulator which, in turn, is set at a pressure setting that is higher than the pressure setting of the back pressure regulator.

As depicted in FIG. 5, the back pressure regulator 38 is connected to a third duct 40.

A shut-off valve 42, which may be a pneumatically operated shut-off valve, only opens when an intake duct pressure falls below a predetermined negative intake pressure. The shut-off valve 42 is disposed downstream of the back pressure regulator and between the back pressure regulator and the air intake duct.

A fourth duct 44 connects the shut-off valve 42 to the air intake duct 12. In the embodiment illustrated by way of example in FIG. 5, this fourth duct delivers the vent gases downstream of the air filter 13. Connecting the fourth duct to the air intake downstream of the air filter takes advantage of the reduced pressure due to the pressure loss encountered by the intake air flowing through the filter.

The system 10 may optionally include a demisting filter (not shown but whose design and construction is well understood). The demisting filter may be disposed in one of the ducts between the inlet 20 and the air intake 12 of the engine (e.g. in the first duct, second duct or third duct). The demisting filter removes liquid droplets entrained in the vapor stream.

Operation of the system 10 depicted in FIG. 5 will now be described. In general, the system 10 regulates the flow of vent gases (including combustible vapours of methane and/or other gaseous hydrocarbons) to the air intake of an engine such as a natural gas engine by using both the front pressure regulator 32 and the back pressure regulator 38 in cooperation with the pressure relief device 30 (for over-pressure venting). The front pressure regulator 32 controls the vent gas pressure at the inlet unaffected by the lower pressure in the air intake duct. This ensures the pressure after (downstream of) the front pressure regulator will be unaffected by the pressure present before (upstream of) the front pressure regulator. This pressure may change according to the presence of the filter, the flow resistance of the filter and the amount the filter is plugged due to foreign particle collection.

The front pressure regulator 32 controls the pressure to the back pressure regulator 38. The pressure upstream of the front pressure regulator 32 may change, but the downstream pressure will be controlled by the front pressure regulator 32.

By placing the flow-restricting orifice 36 between the two regulators (i.e. between the front pressure regulator 32 and the back pressure regulator 38) a maximum flow can be defined. This occurs because the pressure before the orifice cannot exceed the pressure determined by the regulator pressure and the pressure downstream of the orifice cannot drop below the pressure determined by the regulator. In this manner the orifice together with the pressure settings of the back and front pressure regulators control the maximum flow of the vent gases to the engine.

The vent gases, which may derive from many sources, are denoted by reference numeral 18. As the pressure of the vent gases in the ducts (piping) rises from the ambient atmospheric pressure, it will exceed the pressure in pipe/duct 34 and gas flows into the pipe/duct 34 until it reaches the regulated pressure at which time the front pressure regulator 32 stops the flow of gases. For example, the regulated pressure could be 1 to 3 kPa.

The back pressure regulator 38 would be set to a very low pressure relative to atmospheric pressure and at a lower pressure than the pressure setting of the front pressure regulator 32, for example 1 kPa.

A pneumatically operated shut-off valve 42 is controlled by the pressure in the engine air intake duct such that it would not open until the intake duct pressure fell below a specified negative intake pressure, typically −3 kPa or more, depending on the specifications of the engine with respect to the amount of intake air and filter restriction.

When the engine intake conditions cause the shut-off valve 42 to open, the back pressure regulator 38 allows vent gases to flow to the air intake of the engine. As the vent gas flow increases, the pressure drop across the orifice 36 increases, reducing the pressure downstream from the orifice, thus causing the pressure regulator to limit the flow of vent gases to the engine intake.

In this way, the maximum vent gas flow to the engine can be set by suitable adjustment of the front and back pressure regulators 32, 38.

If the vent gas flow reaches or exceeds the maximum vent gas flow that can be consumed by the engine, the pressure in pipe/duct 22 will increase sufficiently to cause pressure relief device 30 to open to allow the vent gas to escape to the atmosphere. Accordingly, the system provides a series of regulators or valves that act as sequential gates for staging the flow of vent gases.

The pressure regulators for the system 10 operate at relatively low pressures relative to most commercially available regulators. The system performs best with high-precision, low-pressure regulators.

This system enables the low-pressure control of combustible vent gases being routed to a combustion engine, such as a natural gas internal combustion engine, without requiring the use of a complex electronic control system involving flow-measuring devices, sensors or transducers. In the illustrated embodiment, the vent gases are not compressed. The engine may have a carburetor or fuel injector. The engine may be mechanically coupled to a compressor or other equipment. This is particularly useful in the oil and gas industry for off-grid sites where electricity is not available. For example, the engine may be used for drill rigs, wellhead servicing (e.g. fracturing, acidizing and cementing), etc. The engine may also be part of an electrical generator or used for other applications or in other industries.

Figure 6:
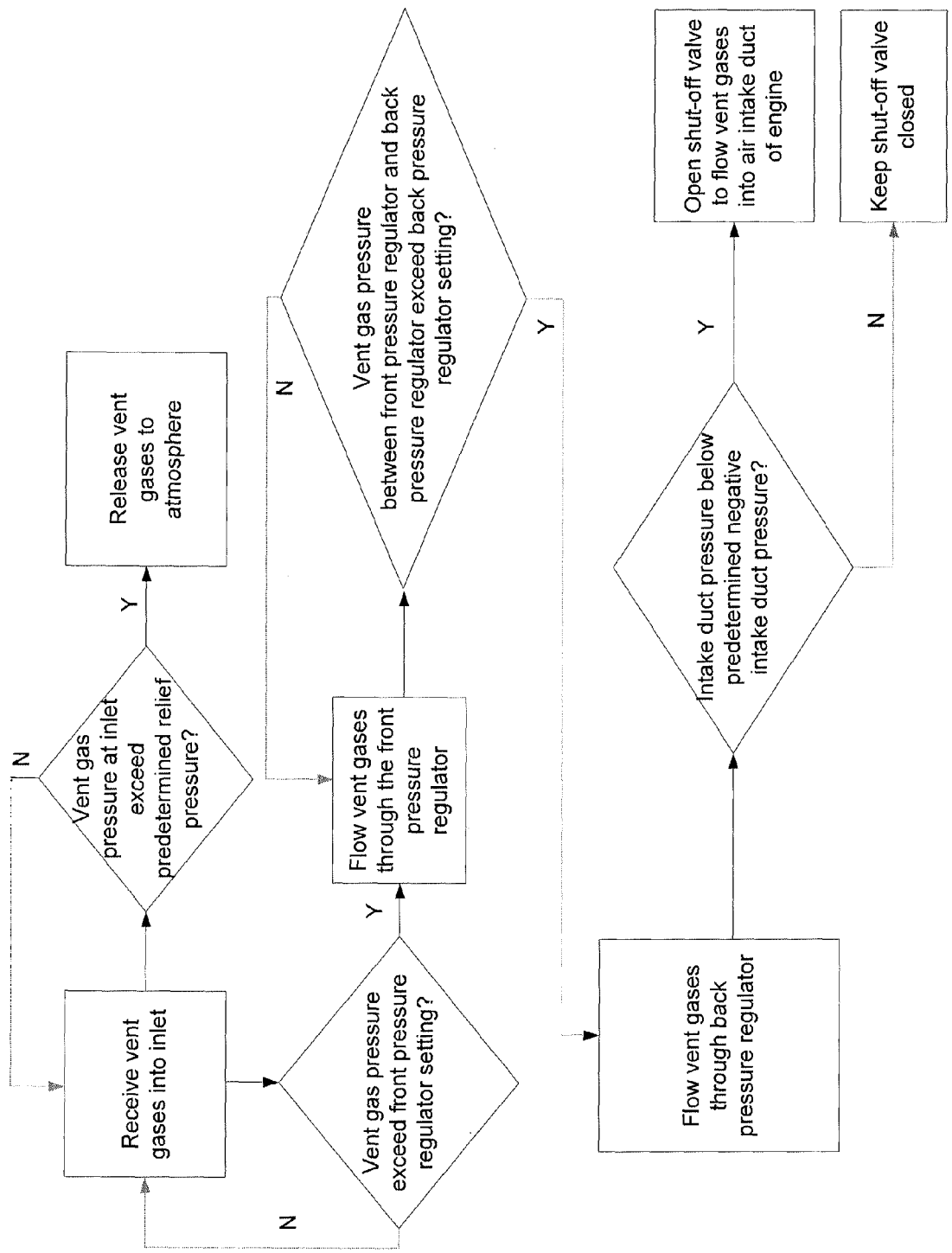
FIG. 6 is a flowchart depicting a method of controlling vent gases using the system of FIG. 5.

FIG. 6 is a flowchart showing a method for controlling a flow of vent gases into an air intake of an internal combustion engine. It will be understood that the method is not to be interpreted as a sequence of discrete steps but rather a combination of steps, acts, operations or states that may happen or occur simultaneously or sequentially. For example, the relief device may be open while the front pressure regulator is open although, in other circumstances, the relief device may be closed while the front pressure regulator is open. In the flowchart, the rectangular blocks represent gas flows whereas the diamond shapes represent valve pressure comparisons that determine whether a given valve or regulator opens or not.

The method entails receiving vent gases into an inlet. The vent gases are released to atmosphere via a relief device when a vent gas pressure in the inlet exceeds a predetermined relief pressure that is set at a higher pressure than the front pressure regulator. When the vent gas pressure in the inlet exceeds a front pressure regulator setting of a front pressure regulator, the vent gases are allowed to flow through the front pressure regulator downstream toward a back pressure regulator. The back pressure regulator is set at a back pressure regulator setting that is lower than the front pressure regulator setting. If the vent gas pressure between the front pressure regulator and the back pressure regulator exceeds a back pressure regulator setting, the vent gases are permitted to flow through the back pressure regulator. A shut-off valve between the back pressure regulator and an air intake duct of the engine opens and closes depending on an intake duct pressure. If the duct intake pressure is below a predetermined negative intake duct pressure, the shut-off valve is opened to enable the vent gases to flow into the air intake of the engine. If the intake duct pressure is equal to or above the predetermined negative intake duct pressure, the shut-off valve remains closed. In one embodiment, the method further entails restricting a flow of the vent gases using a flow-restricting orifice disposed between the front pressure regulator and the back pressure regulator. The method may optionally include demisting the vented gases using a demisting filter disposed in a duct between the inlet and the air intake of the engine.

Figure 7:
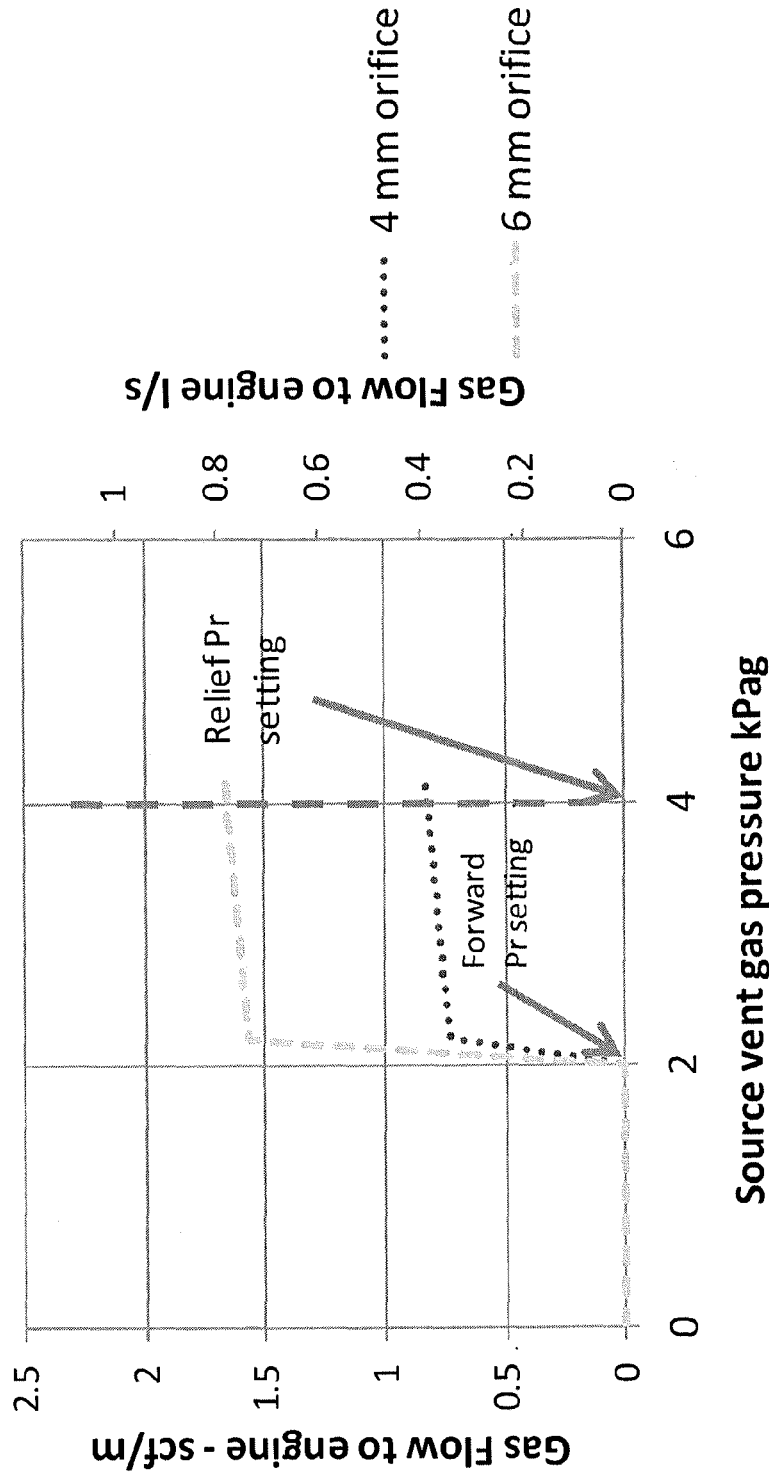
FIG. 7 is a graph showing system performance for a two-regulator system.

The flow characteristic of the system and method of FIGS. 5-6 is shown by the graph depicted in FIG. 7. Note that the vent gas flow rate from the source(s) is only slightly affected by the pressure in the vent gas system. Consider the case when the shut-off valve 42 is open. When the vent gas flow 18 is zero there is no gas flow to the engine air duct 12. When the vent gas starts to flow, it will cause the pressure in duct 26 to rise until the set-point of the forward pressure regulator 32 is reached. Then the vent gas flows into duct 34 and through the orifice 36 to the back pressure regulator 38. Initially there is no flow until the set-point of the back pressure regulator 38 is reached. Since the back pressure set-point is below the pressure set-point of the forward pressure regulator 32, gas flows through the shut-off valve 42 to the intake air duct 12 of the engine. As the vent gas flow rate increases, the pressure drop across the orifice 36 increases. Eventually, the pressure after the orifice 36 drops below the set-point of the back pressure regulator 38, and the vent gas flow to the engine air intake duct 12 is at its maximum. If the vent gas source flow increases beyond this limit, the vent gas pressure before the forward pressure regulator 32 increases and rapidly reaches the relief pressure and the excess vent gas is vented to the atmosphere through pressure relief device 30.

FIG. 7 is a graph showing system performance for a two-regulator system. The graph shows the expected flow characteristic for a system with a forward pressure setting of 2 kPa and a relief pressure setting of 4 kPa. The key advantage to this arrangement is that if the source vent gas flow falls in the range between a very small flow, 0.1 liters/s to below the maximum flow determined by the orifice size (1.0 liters per second for a 4 mm orifice and 2.2 liters per second for a 6 mm orifice), the system keeps the vent gas pressure relatively constant at the forward pressure regulator setting. In this way, the maximum vent gas flow to the engine can be set by suitable adjustment of regulators 32 and 38. If the vent gas flow becomes greater than the vent gas that can be delivered to the engine, the pressure in duct 26 increases sufficiently to cause the relief device 30 to open and allow the vent gas to escape to the atmosphere.

Figure 8:
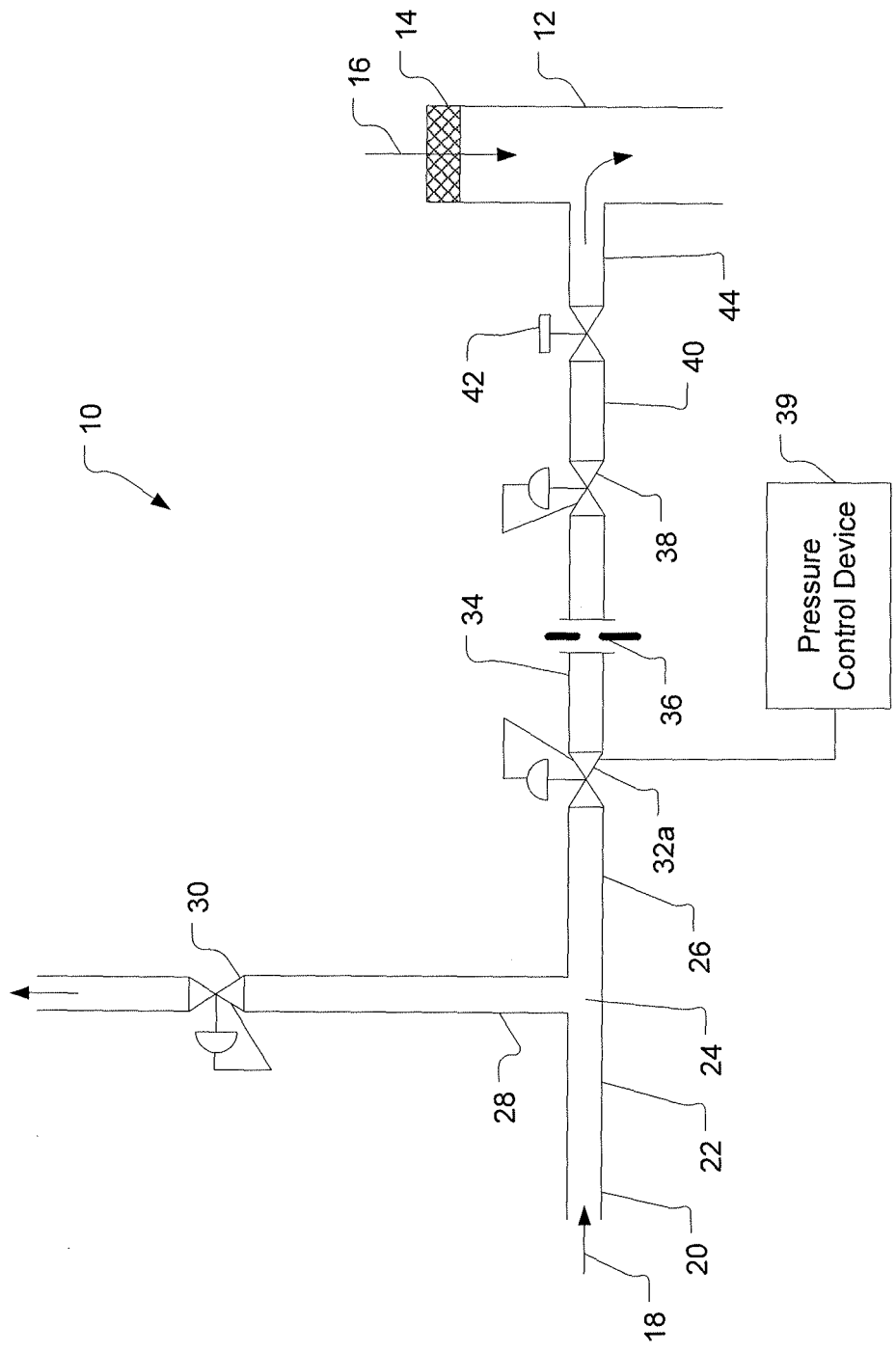
FIG. 8 is a schematic depiction of a system for controlling vent gases routed to an air intake duct of an internal combustion engine in accordance with a fourth embodiment of the invention.

FIG. 8 is a schematic depiction of a system 10 for controlling vent gases routed to an air intake of an internal combustion engine in accordance with a fourth embodiment of the invention. The system and method of FIG. 8 uses an additional device to adjust the setting of the forward pressure regulator setting, therefore enabling an adjustment to the vent gas flow maximum. For this system and method, the forward pressure regulator 32 is replaced by a biased forward pressure regulator 30a in which a pressure control device 39 (i.e. an additional pressure source) is used to modify the regulator set-point. Here the pressure in duct 34 is controlled by the biased forward pressure regulator 32a, but the regulating pressure can be adjusted by the pressure control device 39. In this way, the maximum flow rate can be adjusted by the pressure control device 39 without changing the orifice size.

The pressure control device 39 can be any one of a number of devices such as a current-to-pressure transducer or a pneumatic relay. For pressure control device 39 a proportional pneumatic relay could use the engine intake manifold pressure value to adjust the bias pressure and so adjust the maximum vent gas flow according to the engine load.

Figure 9:
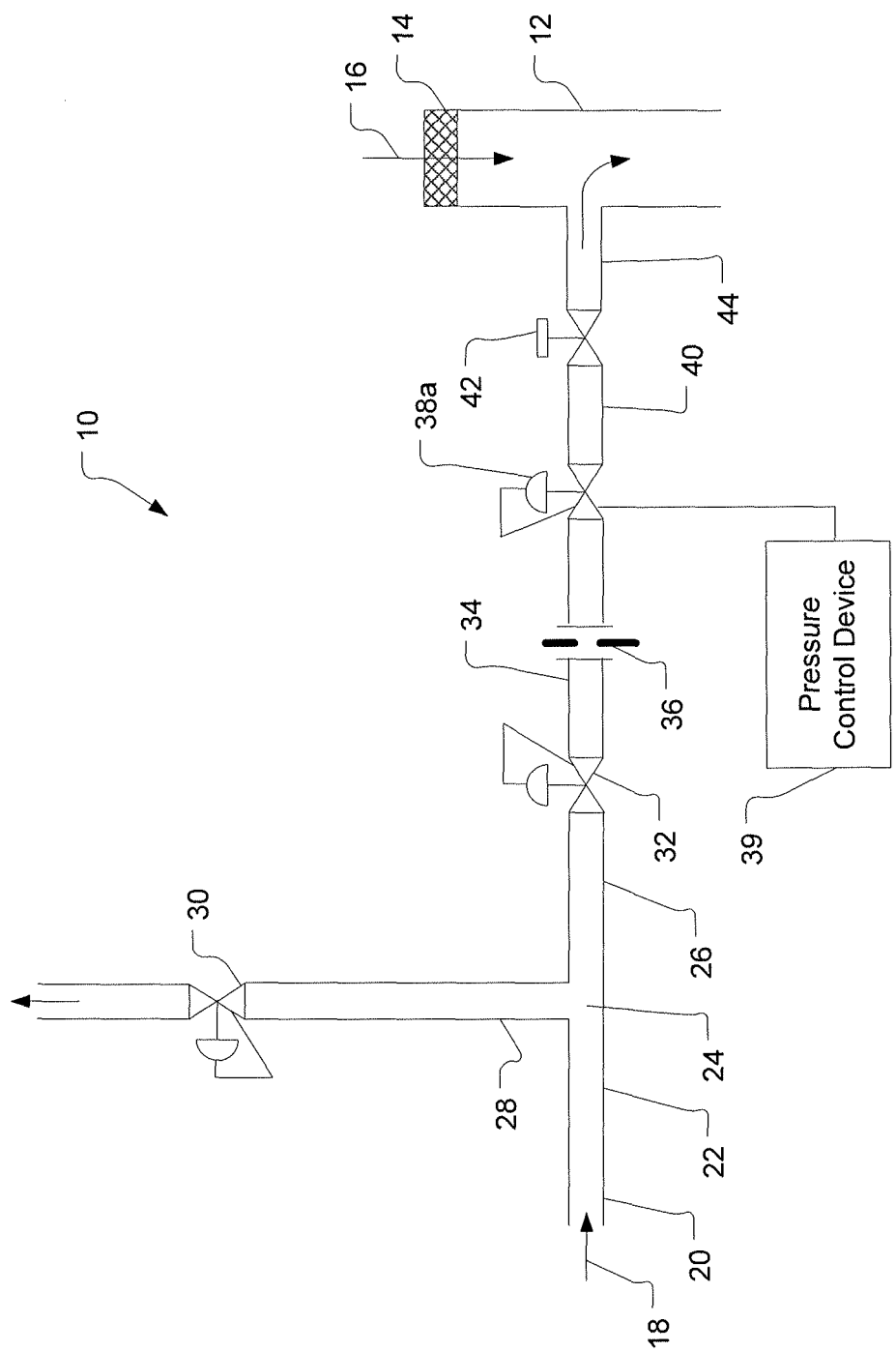
FIG. 9 a schematic depiction of a system for controlling vent gases routed to an air intake duct of an internal combustion engine in accordance with a fifth embodiment of the invention.

FIG. 9 a schematic depiction of a system 10 for controlling vent gases routed to an air intake duct 12 of an internal combustion engine in accordance with a fifth embodiment of the invention. The system 10 depicted in FIG. 9 is a variant of the system of FIG. 8 with a biased regulator 38a replacing regulator 38 and a normal forward pressure regulator 32 replacing biased regulator 32a. The pressure control device 39 can be anyone of a number of devices to adjust the setting of the back pressure regulator.

In all of the systems illustrated in FIGS. 1-9, a shut-off valve 42 is used to eliminate the possibility of the combustible vent gases reaching the engine intake duct when the engine is off or the engine is operated under conditions where the addition of combustible vent gases to the engine intake air is undesired. The shut-off valve may be controlled by a pneumatic or electrical signal. A pneumatically operated shut-off valve 42 may be controlled by the pressure in the engine intake duct 12 such that the shut-off valve 42 does not open until the intake duct pressure falls below a specified negative intake pressure, typically −3 kPa or more, depending on the specifications of the engine with respect to the amount of intake air and filter restriction. When the engine intake duct conditions cause the shut-off valve 42 to open, and there is a non-zero vent gas flow, the various methods described allow vent gas to flow to the engine intake. The shut-off valve may be controlled by alternate means as described below. The shut-off valve may be placed in ducts 26, 37, or 40 in FIG. 1. As well a demisting filter may be placed in any one of these ducts. The demisting filter may be disposed in the same duct as the shut-off valve or, alternatively, the demisting filter may be disposed in a duct that does not have the shut-off valve.

Figure 10:
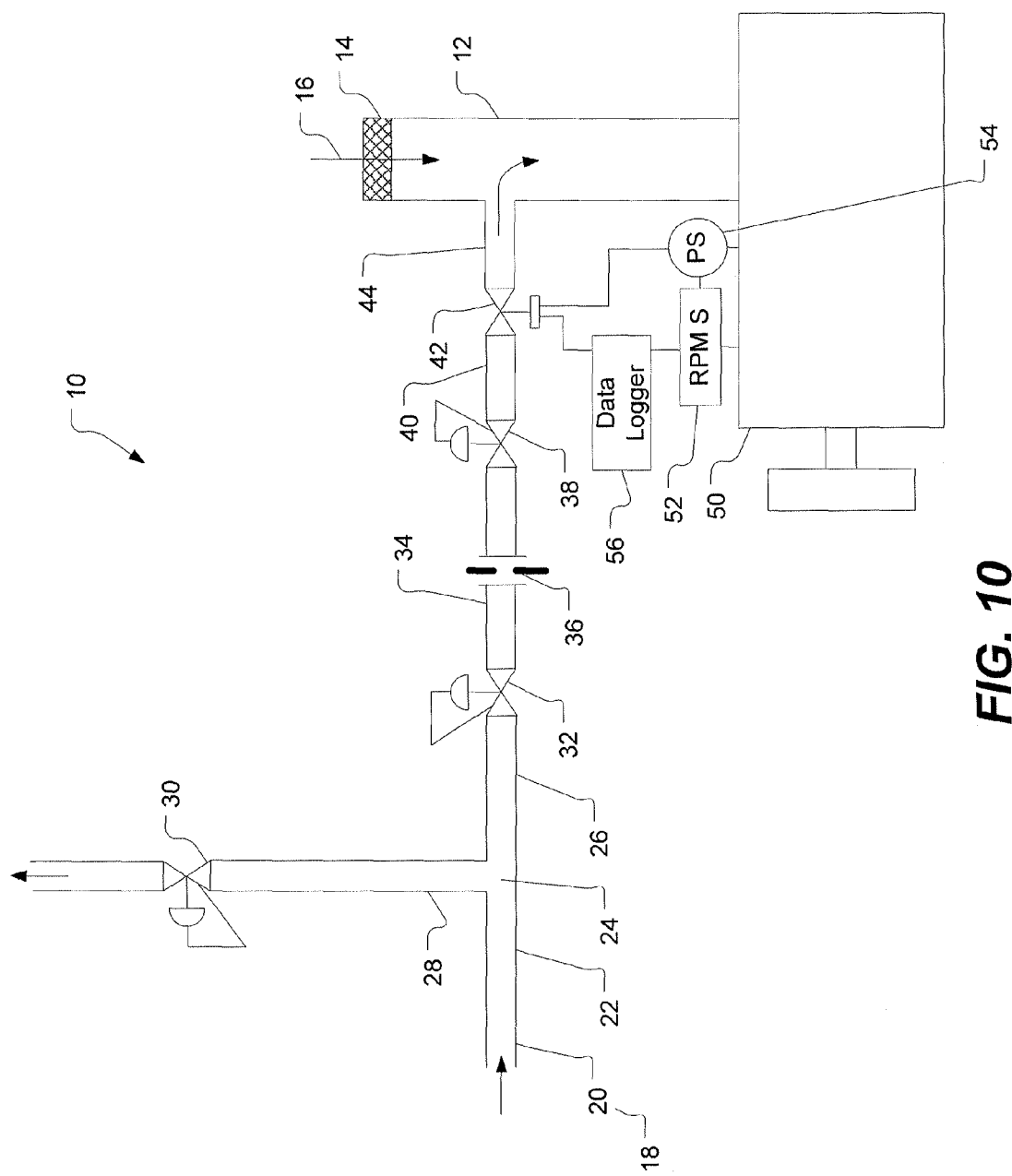
FIG. 10 is a schematic depiction of a sixth embodiment of the system having both RPM-responsive and pressure-responsive switches for regulating the vent gases.

FIG. 10 depicts another system 10 for controlling the flow of vent gases into the air intake 12 of a combustion engine 50. The system 10 depicted in FIG. 10 is similar to the system depicted in FIG. 5 but includes some additional components, namely an engine speed switch (e.g. an RPM-responsive switch) 52 and a pressure-responsive switch 54 for regulating the opening and closing of the shut-off valve 42. FIG. 10 is a simplified schematic depiction of the air intake duct and engine, and it will be appreciated that the air intake delivers air to an intake air manifold for distribution to the engine. The pressure-responsive switch (or "pressure switch") may be located in the air intake manifold in one embodiment. The intake air manifold distributes the intake air or air-fuel mixture to the engine cylinders. Between the intake air duct and the intake manifold there may optionally be located a throttle plate to control the pressure in the intake manifold; in some engines, there may be a turbocharger or supercharger to increase the pressure in the intake manifold above atmospheric pressure. The pressure switch may be in the intake air duct such that, as the engine power increases, there is an increased pressure drop due to the intake air duct filter, so a greater negative pressure relative to atmosphere can be used as a threshold for the shut-off valve. Alternatively, the pressure switch may measure the intake air manifold pressure such that when the engine's power increases the absolute pressure in the intake air manifold increases and the absolute pressure can be used as a threshold for the shut-off valve. As such, for the purposes of this specification, the engine air intake includes an air intake duct and an air manifold, and may further include a throttle plate, throttle device, turbocharger or supercharger. The pressure switch may thus have a pressure sensor (or pressure transducer) located in the intake duct for measuring intake duct pressure or in the air intake manifold for measuring manifold pressure.

This system controls the vent gas flow to a natural gas engine with a moderate flow rate. For example a maximum flow limit of 2 kg/h which, for natural gas with a density of 0.7 kg/m$^3$, or a specific gravity, relative to air at 15 C, of 0.573, is a flow of 2.86 sm$^3$/h=1.68 scf/m=101 scf/h. This flow is sufficient for many systems that use pneumatic devices with compressed natural gas as the pneumatic fluid for control purposes. Higher or lower flow maxima may be contemplated by suitable sizing of the flow apparati.

The actual gas flow to the natural gas engine is controlled by a special arrangement of flow control devices with one or more pneumatic shut-off valves controlled by two switches that monitor the engine state. To limit the maximum vent gas flow, the system may utilize one of the arrangements shown in FIG. 1, 3, 5, 8 or 9 with the additional engine speed-responsive switch.

The vent gas flow system ensures that the vent gas flow into the engine does not exceed a vent flow design maximum. Any additional gas is vented to the atmosphere.

In the embodiment depicted by way of example in FIG. 10, an engine RPM (revolutions per minute) switch (or any equivalent engine speed switch) is placed in series with a pressure switch, a switch for controlling the shut-off valve (or valves if two are needed). The electrical version of the control system is shown; a pneumatic version is also possible with appropriate selection of devices.

The engine speed switch (e.g. RPM switch) will close/open only when the engine speed (e.g. RPM) exceeds a predetermined set-point (normally greater than the idle speed or RPM). The pressure switch can be connected to either the air intake duct or the intake air manifold that distributes the air or air and fuel to the engine cylinders. When the pressure switch is connected to the engine intake manifold, the engine intake manifold pressure switch will close/open only when the absolute engine intake manifold pressure exceeds a predetermined value. Placing these switches in series means that both switches must be in the desired condition to allow the shut-off valve 42 to open to admit vent gas to the engine 50. That is, the engine 50 must be operating at or above the specified speed and there must be enough load on the engine to cause the absolute intake manifold pressure to exceed the specified pressure. These two criteria ensure the engine fuel consumption exceeds a known rate, so that the addition of the vent gases does not exceed a predetermined fraction of the total fuel consumption so that the engine will operate in a safe and controlled manner. The maximum gas amount that can be added to the air depends on the air to fuel ratio controller range (or the acceptable rich to lean range of possible operation for an uncontrolled engine). As an example, a natural gas engine consumes fuel at 100 kg/h at rated speed and full load (this is the typical natural gas fuel consumption of an engine producing approximately 600 HP (450 kW) of shaft power) and the air to fuel ratio controller is able to adjust 3% if extra combustible gases come in the air stream. Thus the maximum fuel that can be added in the air stream is 3 kg/h. If, however, the engine is running at 60% of rated speed and at 50% torque (% of power available at the reduced RPM) the fuel consumption drops to 100 kg/h*60%*50%=30 kg/h. 3% of this is 0.9 kg/h. Hence there should be some means of reducing the maximum allowed vent gases according to speed and load. The less desirable alternative is to limit the vent gas maximum to the reduced value for all loads and speeds above a specified lower limit.

The sensing and control devices may be electrical and/or pneumatic so that a system may be constructed with pneumatic devices only, with electrical devices only or with a combination of pneumatic and electrical devices.

As shown in FIG. 10, an optional data-logging device 56 collects data or information on the system operation. The data-logging device 56 may be a greenhouse gas (GHG) data logger 56. The greenhouse gas (GHG) data-logger 56 is an electronic device that records the amount of time the vent gases are routed to the engine for consumption rather than venting. Since the data-logger is an electrical device which already takes an input from an existing system device, the insertion of the sensing and control switches is relatively simple. Use of a low-power solenoid for the shutoff valve will limit the power required for the system. If the data-logger is not required, the arrangement (pneumatic or electrical) could be fitted to an engine compressor control unit to achieve a unit with zero venting of system vent gases.

Figure 11:
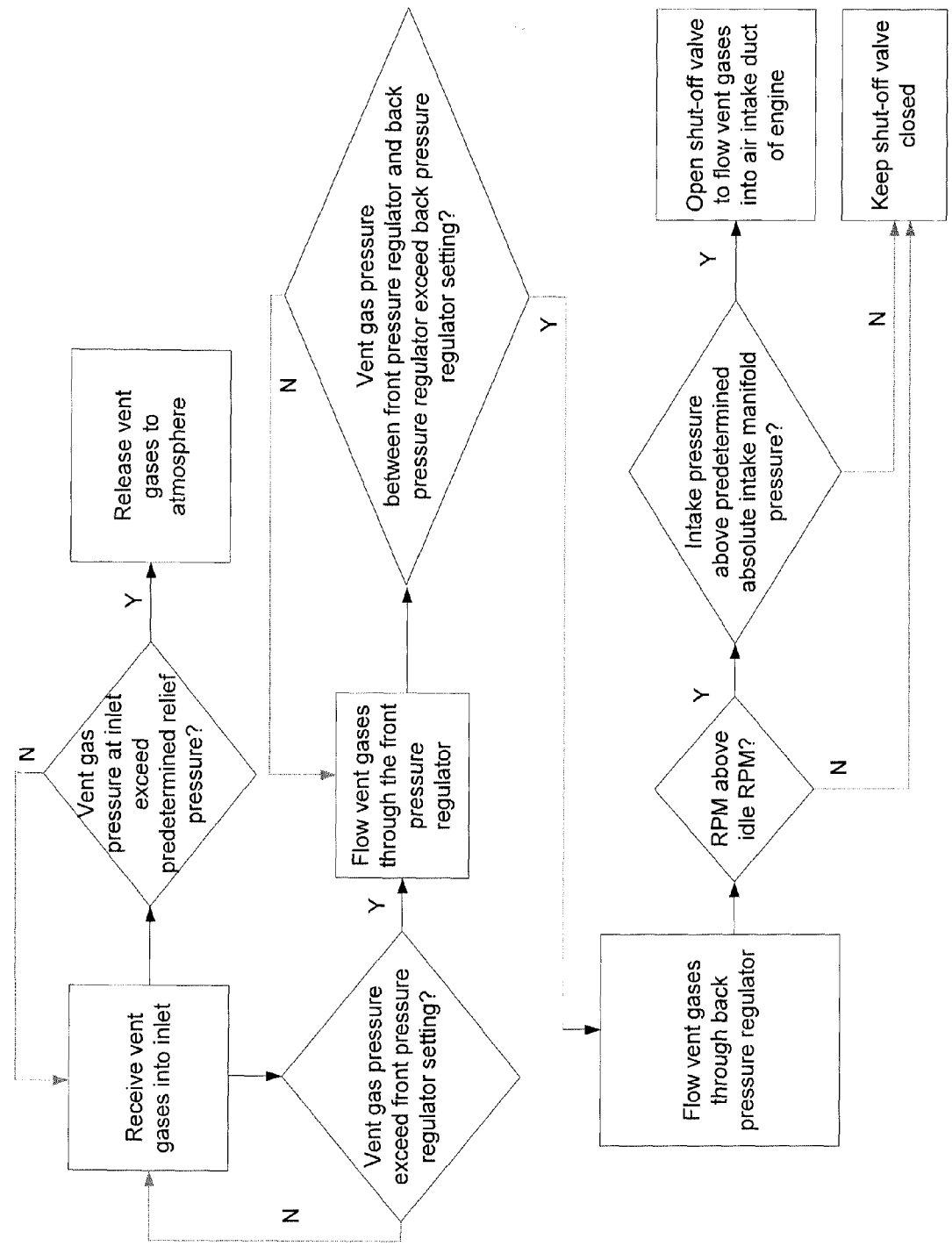
FIG. 11 is a flowchart depicting a method of controlling vent gases using the system of FIG. 10.

FIG. 11 is a flowchart showing a method for controlling a flow of vent gases into an air intake of a combustion engine using the system of FIG. 10. The method of FIG. 11 entails opening or closing the shut-off valve using an engine speed switch or RPM switch responsive to engine speed or RPM. In one implementation, the method involves opening or closing the shut-off valve using a pressure switch in series with the engine speed switch or RPM switch such that the shut-off valve opens only when both an engine speed or RPM is above a predetermined minimal speed or RPM and the intake manifold pressure is above the predetermined absolute intake manifold pressure or, for naturally aspirated engines when both an engine speed or RPM is above a predetermined minimal speed or RPM and the intake manifold gauge vacuum is less than the predetermined vacuum.

Depending on the quantity of vent gases available, the rate of flow of such emissions and the existing air-fuel control method for the combustion process, a variety of control techniques are available to adjust the normal fuel and air supplied to the engine when the vent gases are being used as a supplementary fuel. In other words, the standard air-fuel ratio (when the engine is running without supplementing the combustion with vented gases) may be adjusted or varied to account volumetrically for the air-fuel ratio of the intake air and vented gases being supplied to the engine. This may entail running the air-fuel mixture leaner or richer to compensate for a richer or leaner air-fuel ratio of the vent gas and air mixture.

For a typical natural gas engine, the ideal air-to-fuel ratio (stoichiometrically) is about 17:1 (air mass to methane mass) or about 9.5:1 (air volume to methane volume). Since natural gas is 90% or more methane (the rest is ethane, propane, nitrogen, carbon dioxide and traces of other gases) the ratios for natural gas are about the same. A natural gas engine can run rich to about 14:1 and lean to about 25:1

(mass ratios), although at the extremes operation may be poor or erratic for some cylinders (poor or no combustion). With air-to-fuel ratio controllers, the control system seeks to maintain a pre-specified air-to-fuel ratio (usually for exhaust emissions control). The range of the controller, and hence its ability to adjust for the addition of combustible gases to the air stream, thus imposes a limit on how much combustible gas may be added to the air while still allowing the controller to achieve the pre-specified ratio.

The systems and methods described above provide simple and efficient control of the vent gases so that an optimal, or at least improved, flow of vent gases is achieved into the engine using only simple control devices. The system is easy to install and simple to operate.

Although the description discloses example methods, systems and apparatus including, it should be noted that such methods, systems and apparatus are merely illustrative and should not be considered as limiting. Accordingly, while the preceding describes example methods, systems and apparatus, persons having ordinary skill in the art will readily appreciate that the examples provided are not the only way to implement such methods, systems and apparatus.

The scope of the claims should not be limited, by the preferred embodiments set forth in the examples, but should be given the broadest interpretation consistent with the description as a whole.

The invention claimed is:

1. A system for controlling a flow of vent gases to a combustion engine, the system comprising:
   an inlet for receiving the vent gases;
   a pressure relief device that enables the vent gases to escape to atmosphere when a pressure in the inlet exceeds a predetermined relief pressure;
   a flow-restricting orifice;
   a back pressure regulator disposed downstream of the orifice for regulating a maximum pressure in a duct between the orifice and the back pressure regulator;
   a front pressure regulator set at a front pressure setting and disposed upstream of the back pressure regulator that is set at a back pressure setting that is lower than the front pressure setting; and
   a shut-off valve disposed between the back pressure regulator and an air intake duct of the engine, the valve being set to only open when an intake duct pressure falls below a predetermined pressure.

2. The system of claim 1 wherein the back pressure regulator is a biased back pressure regulator and wherein the system comprises a pressure control device for applying a bias pressure to adjust a back pressure setting of the back pressure regulator.

3. The system of claim 1 wherein the front pressure regulator is a biased front pressure regulator and wherein the system comprises a pressure control device for applying a bias pressure to adjust a front pressure setting of the front pressure regulator.

4. The system of claim 1 wherein the back pressure regulator is a biased back pressure regulator and wherein the system comprises a pressure control device for applying a bias pressure to adjust a back pressure setting of the back pressure regulator.

5. The system of claim 1 wherein the vent gases flow into the air intake duct downstream of an air filter of the air intake duct.

6. The system of claim 1 further comprising a demisting filter disposed in a duct between the inlet and the air intake of the engine.

7. The system of claim 1 further comprising an engine speed switch responsive to engine speed to regulate opening and closing of the shut-off valve.

8. The system of claim 7 wherein the engine speed switch is disposed in series with a pressure switch such that the shut-off valve opens only when both an engine speed is above a predetermined minimal engine speed and a negative intake duct pressure differential relative to atmosphere is below a predetermined pressure differential.

9. The system of claim 7 wherein the engine speed switch is disposed in series with a pressure switch such that the shut-off valve opens only when both an engine speed is above a predetermined minimal engine speed and an absolute intake manifold pressure is above a predetermined intake manifold pressure.

10. The system of claim 1 further comprising a data logger for recording an amount of time that the vent gases are flowing into the engine.

11. The system of claim 1 wherein the vent gases comprise primarily methane and wherein the engine is a natural gas engine.

12. A method for controlling a flow of vent gases to a combustion engine, the method comprising:
   receiving vent gases into an inlet;
   releasing the vent gases to atmosphere via a pressure relief device when a vent gas pressure in the inlet exceeds a predetermined relief pressure;
   flowing the vent gases through a flow-restricting orifice;
   flowing the vent gases through a back pressure regulator when the vent gas pressure exceeds a back pressure regulator setting a back pressure regulator;
   flowing the vent gases through a front pressure regulator set at a front pressure setting and disposed upstream of the back pressure regulator that is set at a back pressure setting that is lower than the front pressure setting; and
   opening a shut-off valve between the back pressure regulator and an air intake duct of the engine to enable the vent gases to flow into the air intake duct of the engine if an intake duct pressure is below a predetermined pressure.

13. The method of claim 12 further comprising applying a bias pressure to adjust a back pressure setting of a biased back pressure regulator.

14. The method of claim 12 further comprising applying a bias pressure to adjust a front pressure setting of a biased front pressure regulator.

15. The method of claim 12 further comprising applying a bias pressure to adjust a back pressure setting of a biased back pressure regulator.

16. The method of claim 12 comprising flowing the vent gases flow into the air intake duct of the engine downstream of an air filter of the air intake.

17. The method of claim 12 further comprising demisting the vented gases using a demisting filter disposed in a duct between the inlet and the air intake of the engine.

18. The method of claim 12 further comprising opening or closing the shut-off valve using an engine speed switch responsive to engine speed.

19. The method of claim 18 further comprising opening or closing the shut-off valve using a pressure switch in series with the engine speed switch such that the shut-off valve opens only when both an engine speed is above a predetermined minimal engine speed and a negative intake duct pressure differential relative to atmosphere is below a predetermined pressure differential.

20. The method of claim 18 further comprising opening or closing the shut-off valve using a pressure switch in series with the engine speed switch such that the shut-off valve opens only when both an engine speed is above a predetermined minimal engine speed and an absolute intake manifold pressure is above a predetermined intake manifold pressure.

21. The method of claim 12 further comprising recording an amount of time that the vent gases are flowing into the engine using a greenhouse gas data logger.

22. The method of claim 12 wherein the vent gases received into the inlet comprise primarily methane and wherein the engine is a natural gas engine.

* * * * *